(12) United States Patent
Ohya

(10) Patent No.: US 6,472,968 B1
(45) Date of Patent: Oct. 29, 2002

(54) IRON CORE AND ELECTROMAGNETIC DRIVING MECHANISM EMPLOYING THE SAME

(75) Inventor: Ikuo Ohya, Takatsuki (JP)

(73) Assignee: Techno Takatsuki Co., Ltd., Takatsuki (JP)

( * ) Notice: Subject to any disclaimer, the term of this patent is extended or adjusted under 35 U.S.C. 154(b) by 0 days.

(21) Appl. No.: 09/498,652

(22) Filed: Feb. 7, 2000

(30) Foreign Application Priority Data

Feb. 9, 1999 (JP) .......................................... 11-031516

(51) Int. Cl.⁷ .............................. H01F 7/00; H01F 7/08
(52) U.S. Cl. ...................... 335/229; 335/281; 335/297
(58) Field of Search ................................. 335/281, 297, 335/229–234; 417/410.1, 413.1, 415–419; 336/214, 215, 233, 234

(56) References Cited

U.S. PATENT DOCUMENTS

| 2,925,538 | A | * | 2/1960 | Rasmusen .................... 361/209 |
| 4,700,165 | A | * | 10/1987 | Brisson et al. ............... 335/255 |
| 5,013,223 | A | | 5/1991 | Takahashi et al. ........... 417/413 |
| 5,104,298 | A | | 4/1992 | Takahashi et al. ........... 417/415 |
| 5,808,537 | A | * | 9/1998 | Kondo et al. ................ 336/233 |

* cited by examiner

*Primary Examiner*—Ramon M. Barrera
(74) *Attorney, Agent, or Firm*—Armstrong, Westerman & Hattori, LLP

(57) ABSTRACT

An iron core comprising an outer yoke, side poles disposed on both end portions of the outer yoke, and a center pole disposed between the side poles, wherein a magnetic path of polar portions of the center pole is formed as an open-circuit. There can be restricted for short-circuiting of magnetic flux of permanent magnets and thrust of an oscillator disposed at an air gap formed between electromagnets can be improved.

2 Claims, 23 Drawing Sheets

41      41

IRON CORE AND ELECTROMAGNETIC DRIVING MECHANISM EMPLOYING THE SAME

BACKGROUND OF THE INVENTION

1. Field of the Invention

The present invention relates to an iron core and an electromagnetic driving mechanism employing the iron core. More particularly, the present invention relates to an iron core employed in, for instance, an electromagnetic oscillating type pump of diaphragm type or piston type, and an electromagnetic driving mechanism employing the iron core, which can improve the thrust of an oscillator disposed between electromagnets disposed in an opposing manner.

2. Description of the Related Art

Electromagnetic type pumps are conventionally used mainly for supplying oxygen to fish-farming aquariums or purifying tanks for domestic use and for sampling gas for inspection to observe pollution. Such a pump comprises, as shown, for example, in FIG. 23, electromagnets 101 disposed in an opposing manner, an oscillator 103 having permanent magnets 102, diaphragms 104 coupled to both ends of the oscillator 103, pump casings 105 fixed at both ends of the electromagnets 101, and a pump compressing chamber 106 formed between the diaphragm 104 and the pump casing 105. Each of the electromagnets 101 is finished by assembling a wound coil 108 in an E-shaped iron core 107, and the oscillator 103 is disposed in an air gap 109 formed between the iron cores 107.

In such a pump, oscillation of the oscillator 103 which is supported by the diaphragms 104 causes an increase/decrease in a capacity of the pump compressing chamber 106 in a deflective manner on the right and left, whereby suction and discharge of air is alternately performed on the right and left.

In a conventional pump, thrust in right and left directions F1, F2 of the oscillator 103 can be achieved by suction force between a pole portion 110a of a side pole 110 of each iron core 107 and the permanent magnet 102 as well as that between a pole portion 111a of a center pole 111 and the permanent magnet 102, as shown in FIG. 24 and in FIG. 25.

At this time, there are respectively generated on a magnetic field formed between the iron cores 107 and the permanent magnets 102 a magnetic path A of a closed-circuit type which is formed by the side pole 110, center pole 111 outer yoke 112 and permanent magnets 102 and a magnetic path B of closed-circuit type which is formed by the center pole 111 and permanent magnets 102.

However, the magnetic path B presents a drawback in that it limits the thrust of the oscillator because it causes short-circuiting of magnetic flux of the permanent magnets 102.

SUMMARY OF THE INVENTION

In accordance with the present invention, there is provided an iron core comprising an outer yoke, side poles disposed on both end portions of the outer yoke, and a center pole disposed between the side poles, wherein a magnetic path of pole portions of the center pole is formed as an open-circuit.

The center pole is preferably formed of a pair of magnetic poles which are separated from each other by a specified distance.

In accordance with the present invention, there is further provided an electromagnetic driving mechanism comprising electromagnets each composed of the iron core and a winding coil which is wound around pole portions of the iron core, and an oscillator with a pair of permanent magnets disposed in an air gap within the electromagnets and separated from each other by a specified distance, wherein outer shape of the pair of permanent magnets which are directly attached to a shaft assume a square or circular shape, and a polarity of the pair of permanent magnets in a peripheral direction is magnetized to be an anisotropic magnetic pole.

DETAILED DESCRIPTION

The iron core and electromagnetic driving mechanism employing the iron core will now be explained based on the accompanying drawings.

Figure 1:
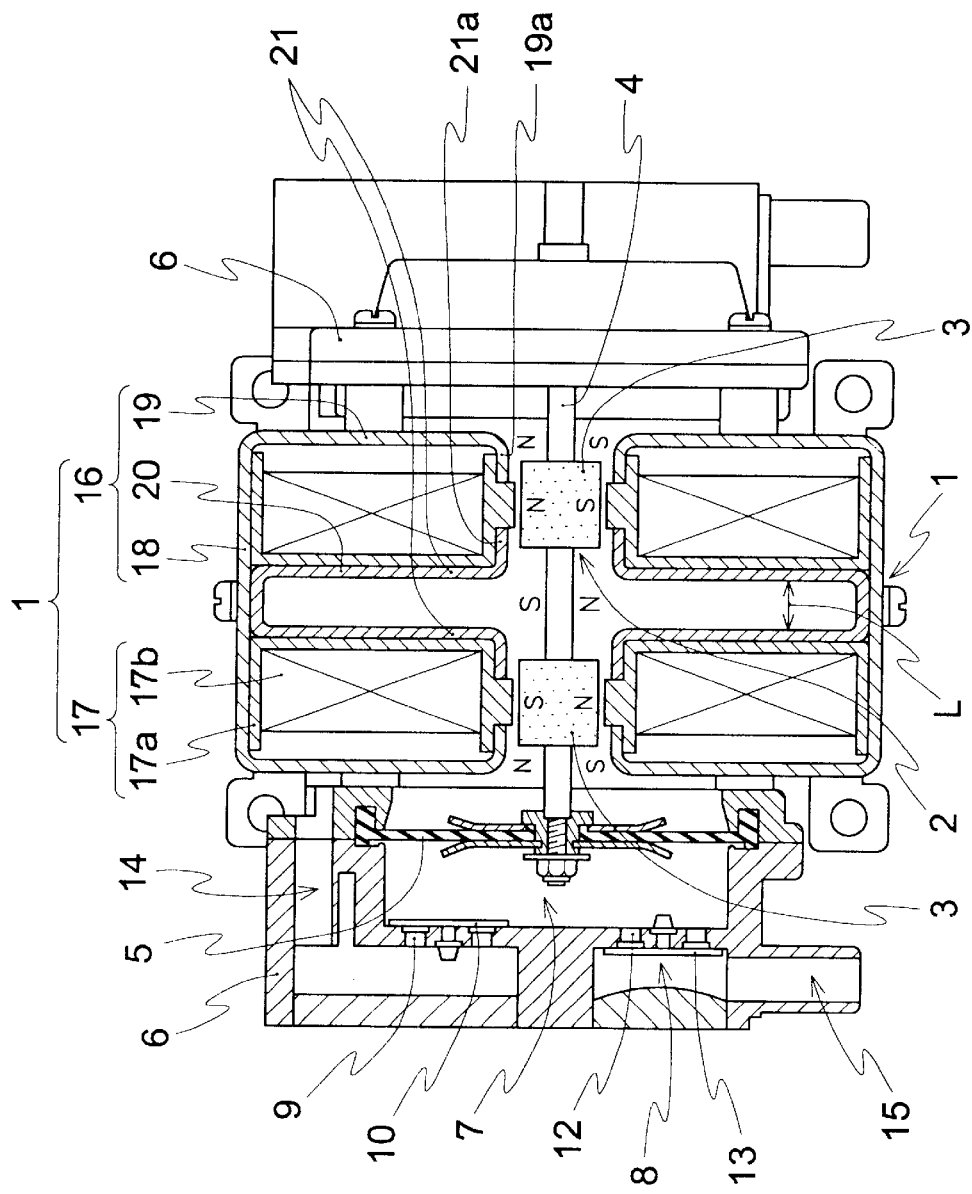
FIG. 1 is a partial longitudinal sectional view showing an electromagnetic oscillating type pump using an iron core according to one embodiment of the present invention.

As shown in FIG. 1, the electromagnetic driving type pump according to one embodiment of the present invention comprises a pair of electromagnets 1 disposed in an opposing manner; an oscillator 4 with permanent magnets 3 of ferrite magnets or rare-earth magnets disposed in an air gap 2 within the electromagnets 1 and separated from each other by a specified distance; diaphragms 5 coupled to both ends of the oscillator 4; and pump casings 6 fixed at both ends of the electromagnets 1. The pump casing 6 includes a suction chamber 7 and a discharge chamber 8 wherein the suction chamber 7 has a suction inlet 9 and a suction valve 10 and the discharge chamber 8 a discharge outlet 12 and a discharge valve 13, respectively. With this arrangement, the diaphragms 5 coupled to the oscillator 4 can be oscillated based on magnetic interaction between the electromagnets 2 and permanent magnets 3, so that external air can be sucked through a suction portion 14 and then be discharged through a discharge portion 15.

Each electromagnet 1 comprises an iron core 16 having an E-shaped section, and a winding coil 17 in which a coil 17b is wound around a bobbin 17a, the winding coil 17 being assembled into a peripheral concave portion of the E-shaped iron coil 16. The iron core 16 is composed of an outer yoke 18, side poles 19 disposed at both ends of the outer yoke 18, and a center pole 20 disposed between the side poles 19. In the illustrated embodiment, the outer yoke 18 and the side poles 19 are uniformly formed by pressing a single steel plate, wherein extension portions 19a which are respectively bent to assume a L-shape in a mutually facing direction are formed at inner peripheral pole portions of the side poles 19. The center pole 20 assumes a π-like shape and includes a pair of magnetic pole portions 21 which are remote from each other by a specified distance L so that a magnetic path formed by the pole portions of the center pole 20 becomes an open-circuit. The center pole 20 is assembled to the outer yoke 18. The distance L is not less than 2 mm in order to prevent a magnetic path from being formed between the permanent magnets 3 and the magnetic pole portions 21, and preferably a maximum value which is mechanically permissible. Further, extension portions 21a which are bent in a L-shaped manner so as to depart from each other are formed at each of the inner peripheral pole portion 21. The extension portions 19a, 21a are respectively arranged as to oppose the permanent magnets 3. By changing the length of the extension portions 19a, 21a, there can be adjusted an area of the air gap formed between the extension portions 19a, 21a and permanent magnets 3. With this arrangement, adjustment of reactance of the winding coils can be performed and current values supplied to the winding coil 17 can be restricted.

Figure 2:
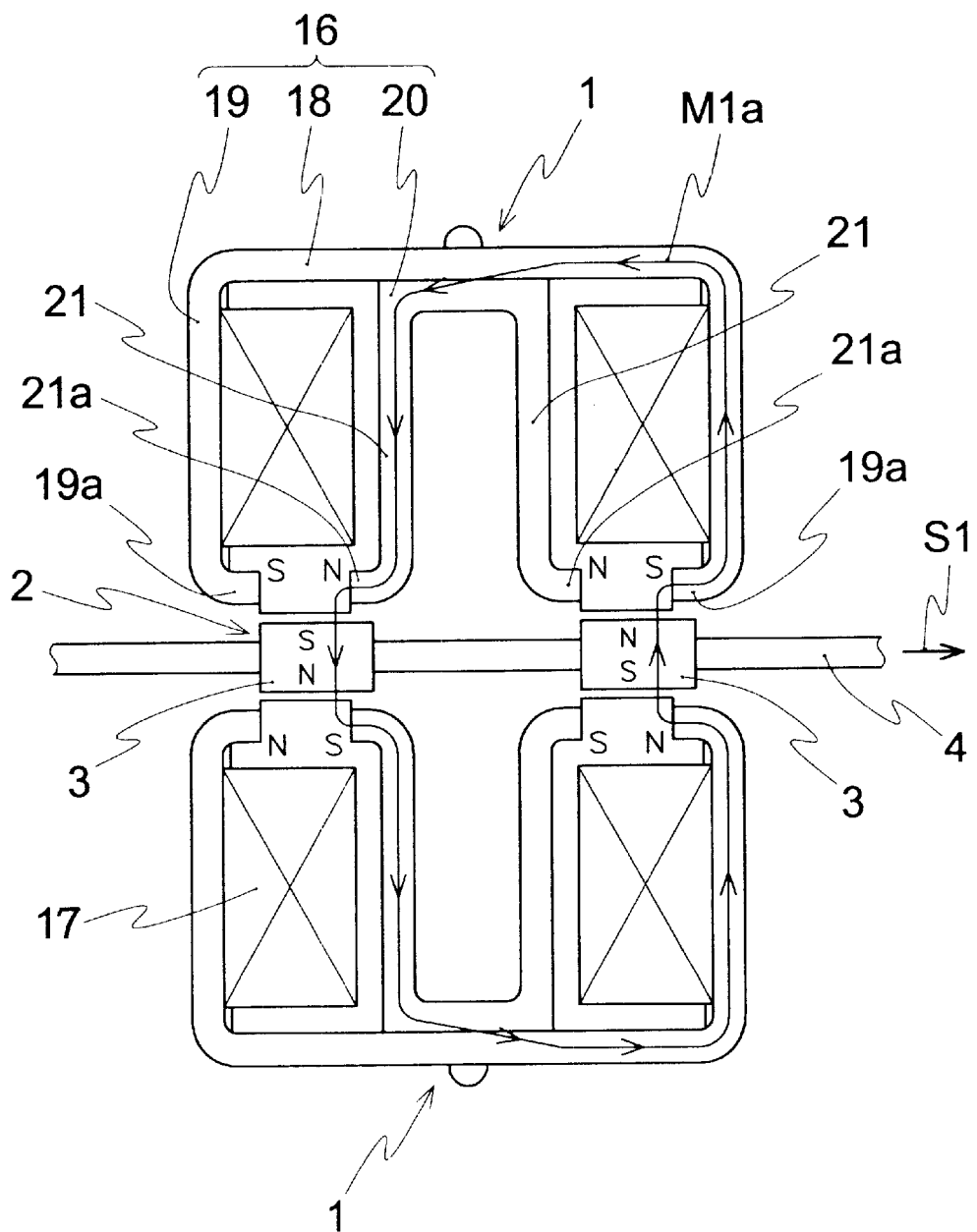
FIG. 2 is an explanatory view for explaining operations of an oscillator in FIG. 1.
Figure 3:
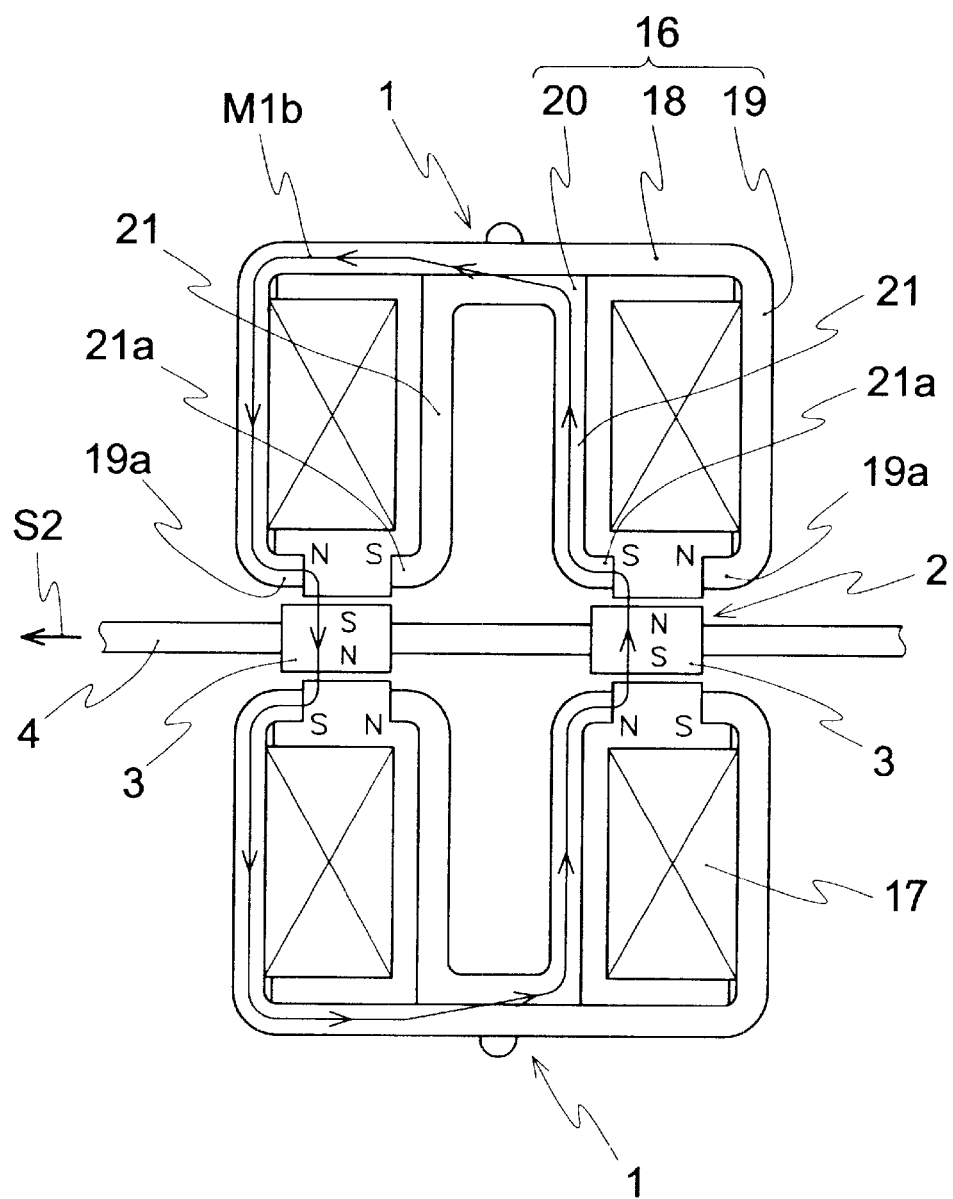
FIG. 3 is an explanatory view for explaining operations of the oscillator in FIG. 1.

In the illustrated embodiment shown in FIGS. 2 and 3, in case alternating current is supplied to the winding coil 17 such that N poles or S poles are generated at the extension portions 19a, 21a which are pole portions of the iron cores 16 of the opposing electromagnets 1, repulsion and absorption between the pair of permanent magnets 3 and the extension portions 19a, 21a serving as pole portions are repeatedly performed, so that the oscillator 4 moves in direction S1 or direction S2.

At this time, the only magnetic path which is generated in the magnetic field formed by the iron cores 16 and the permanent magnets 3 is either magnetic path M1a or M1b formed by the pair of permanent magnets 3, outer yoke 18, side pole 19 and one of the magnetic pole portions 21 of the center polar portion 20, and no magnetic field causing short-circuiting of magnetic flux of the permanent magnets 3 is generated, so that the thrust of the oscillator 4 disposed in the air gap 2 between the electromagnets 1 can be improved.

Figure 4:
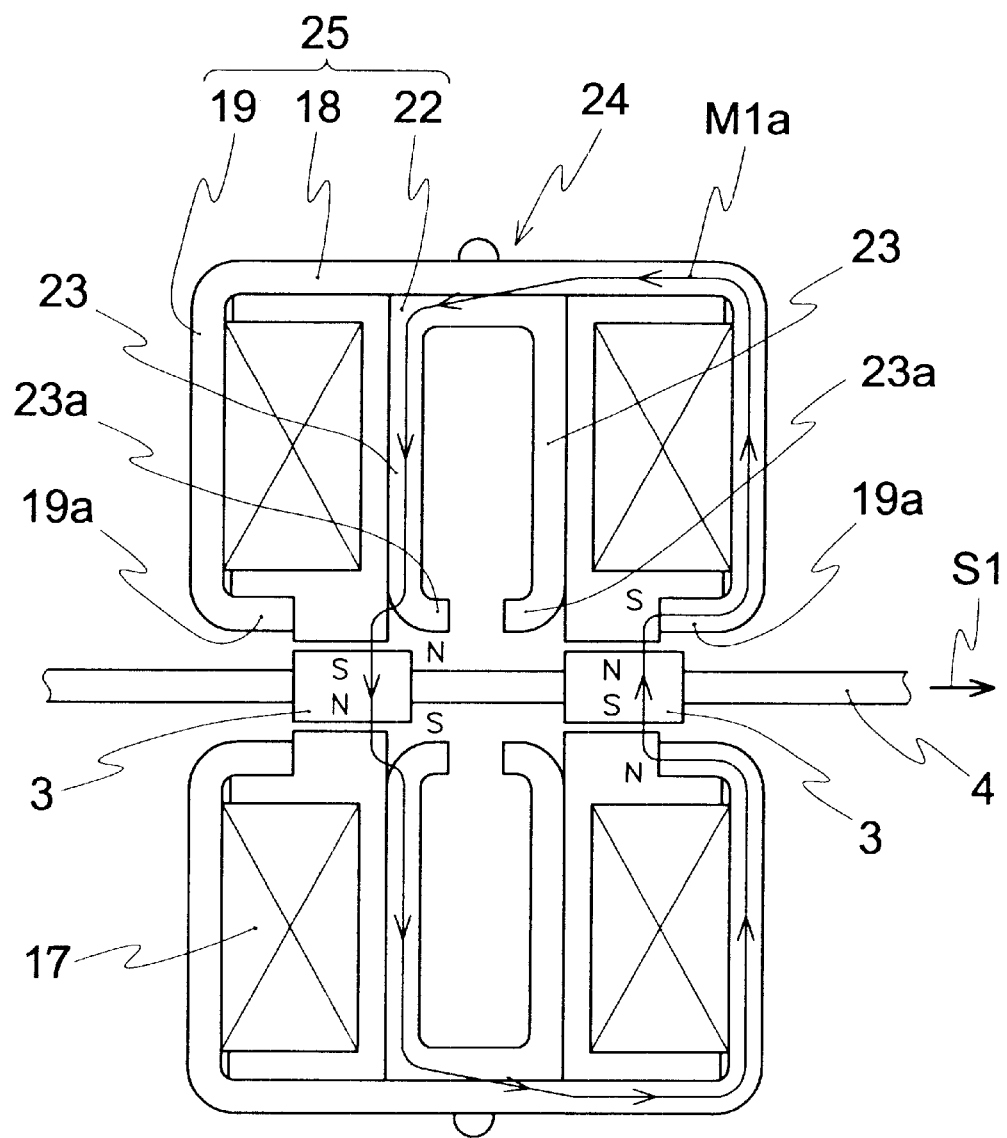
FIG. 4 is an explanatory view for explaining operations of an oscillator in another iron core.
Figure 5:
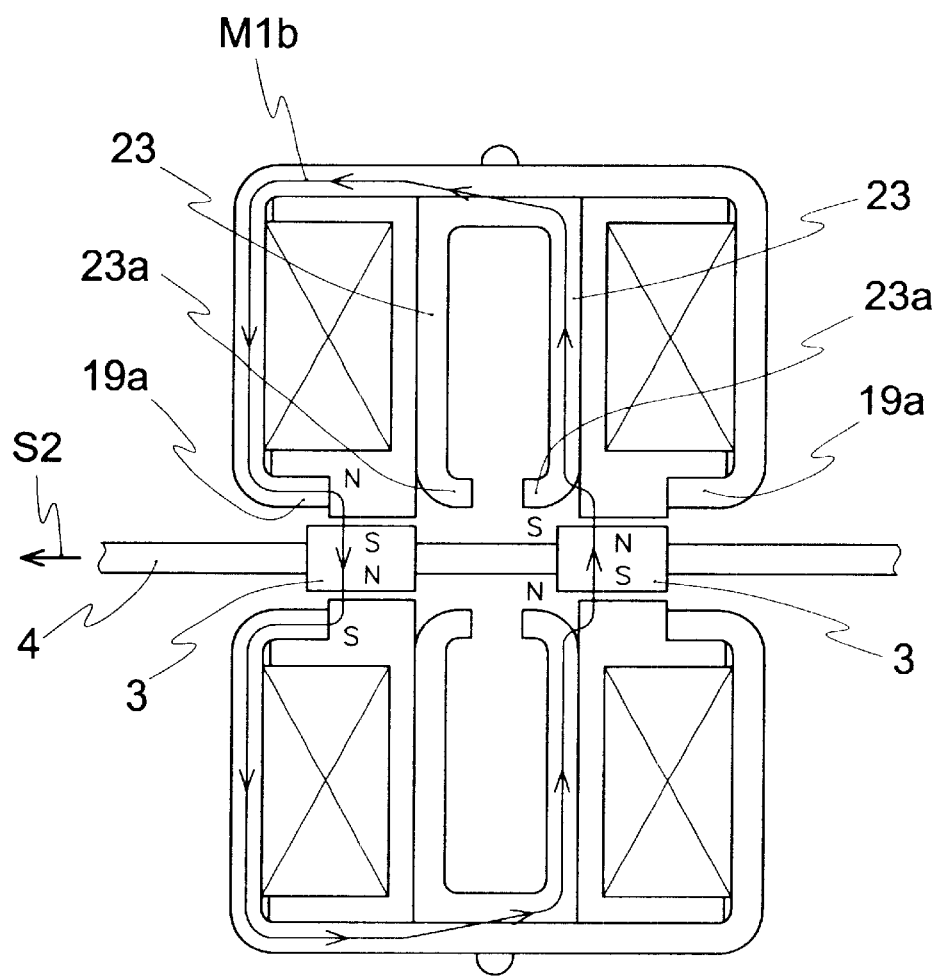
FIG. 5 is an explanatory view for explaining operations of an oscillator in another iron core.

Another iron core according to the present invention will now be explained. In the illustrated embodiment shown in FIGS. 4 and 5, the inner peripheral pole portions of the center pole 22 are formed with extension portions 23a which are bent to assume a L-shape for facing towards each other. Thus, in case alternating current is supplied to the winding coil 17 such that N poles or S poles are generated at the extension portions 19a, 23a which are pole portions of the iron cores 25 of the opposing electromagnets 24 similar to the previous embodiment, one magnetic path M1a or M1b is formed by the pair of permanent magnets 3, outer yoke 18, side pole 19 and one of the magnetic pole 23 of the center pole 22. With this arrangement, repulsion and absorption between the pair of permanent magnets 3 and the extension portions 19a, 23a which serve as pole portions is repeatedly performed, so that the oscillator 4 moves in direction S1 or direction S2.

Figure 6:
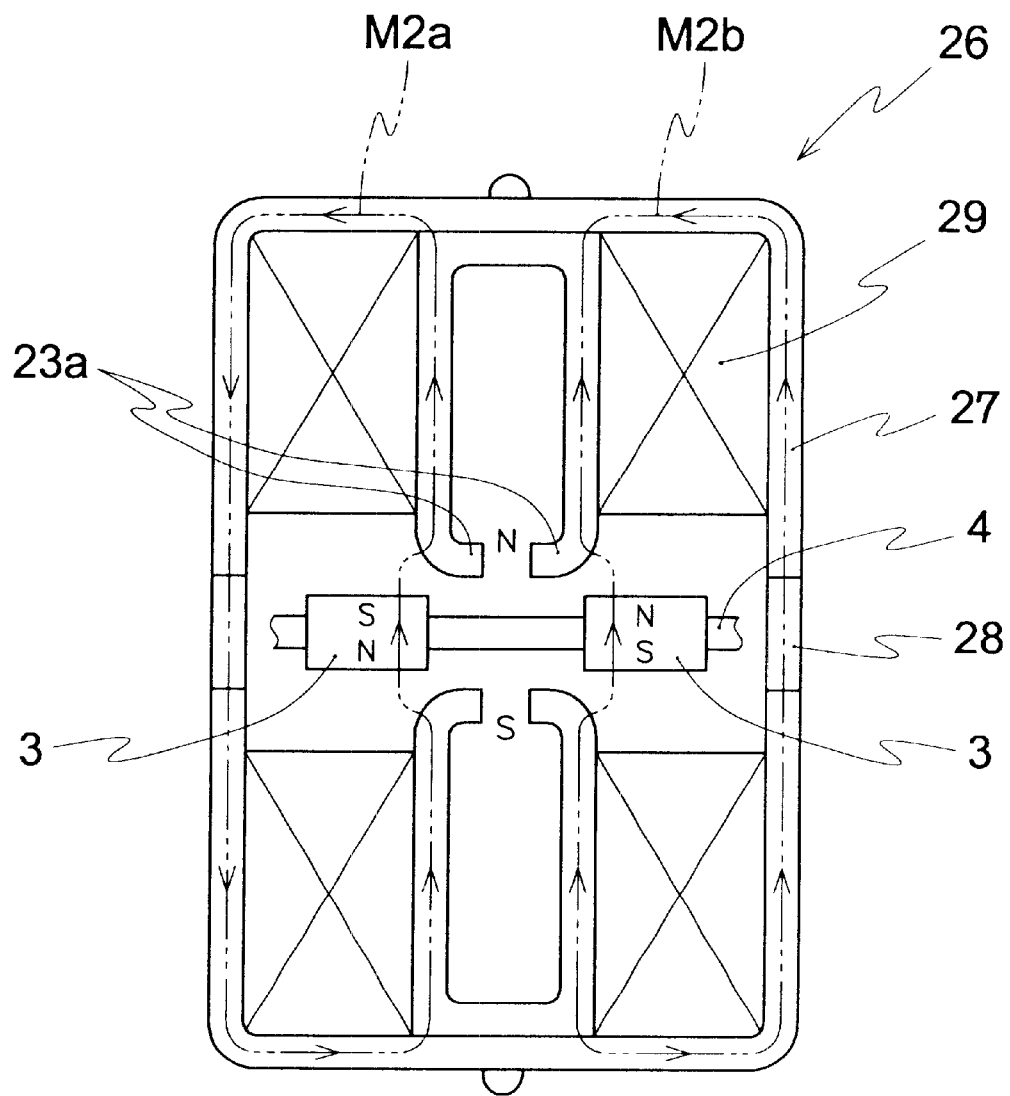
FIG. 6 is a view showing electromagnets related to still another iron core.

Still another iron core according to the present invention will now be explained. While opposing iron cores are formed as separate bodies in the previous embodiments, the iron core 26 in the present embodiment is an integrally formed body as shown in FIG. 6. The oscillator 4 is accordingly inserted into a through-hole 28 formed at a side pole 27 of the iron core 26. Due to the integral arrangement of the iron core 26 in the illustrated embodiment, it can be achieved for a simple structure of the electromagnets to enable easy handling compared to the previous embodiment. However, in case alternating current is supplied to winding coil portions 29 such that N poles or S poles are generated at extension portions 23a which are pole portions of the iron core 26 of the opposing electromagnets, one magnetic path M2a or M2b is formed, which passes through one of the pair of permanent magnets 3. Therefore, since only a one-sided magnetic path M2a or M2b is valid, the thrust of the oscillator 4 is decreased than compared to the cases with the magnetic path M1a or M1b of the previous embodiments in which current of magnetic flux passes through both electromagnets 3.

Figure 7:
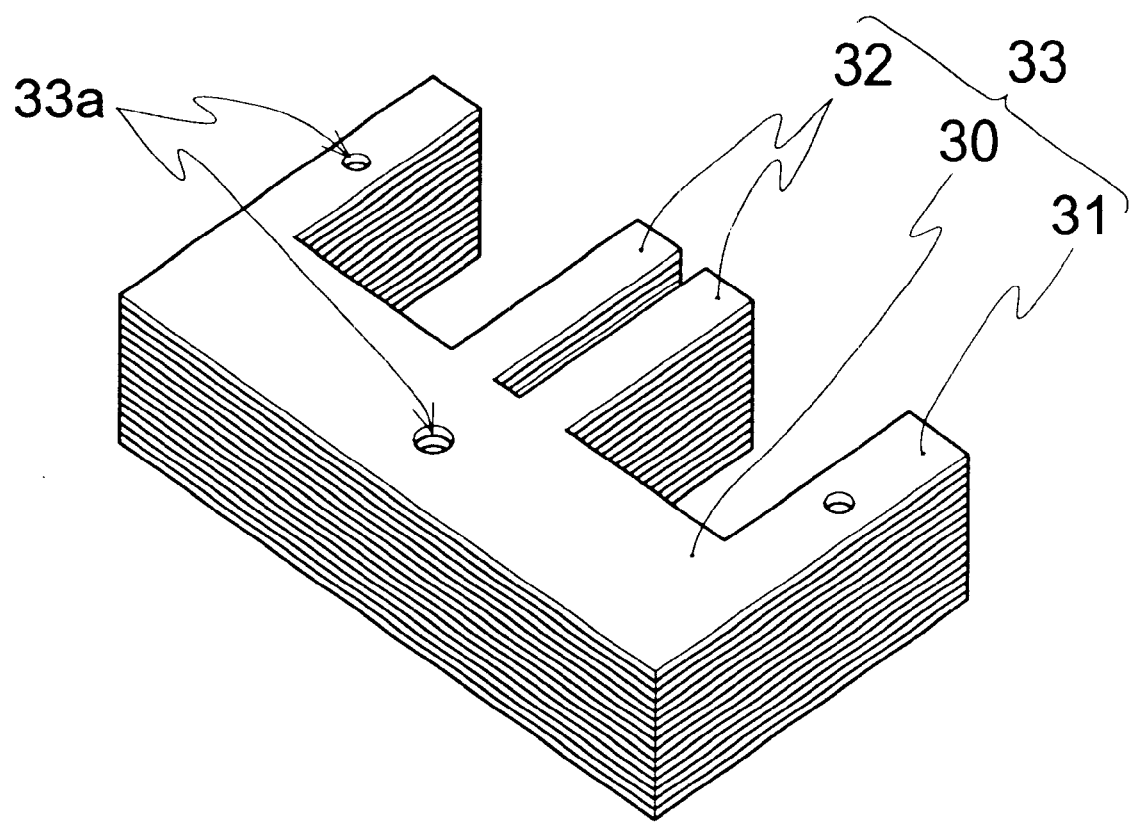
FIG. 7 is a perspective view showing another iron core.

Still another iron core according to the present invention will now be explained. In the illustrated embodiment shown in FIG. 7, an iron core 33 including an outer yoke 30, side poles 31 and center poles 32 is formed by laminating a plurality of stator cores formed of silicon steel plates. It should be noted that 33a denote rivet press-fitting holes for assembling the plurality of laminated stator cores by press-fitting rivets to prevent these from separating.

Figure 8:
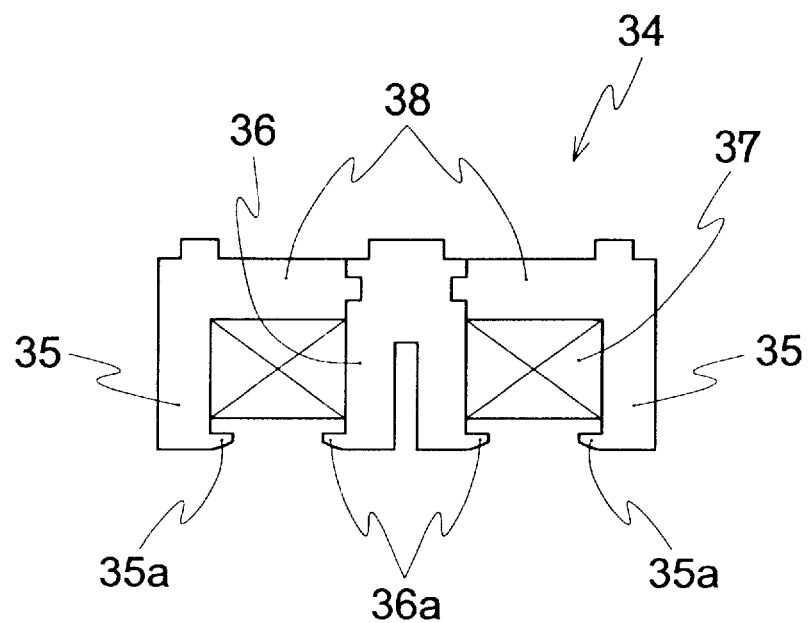
FIG. 8 is a plan view showing still another iron core.
Figure 9:
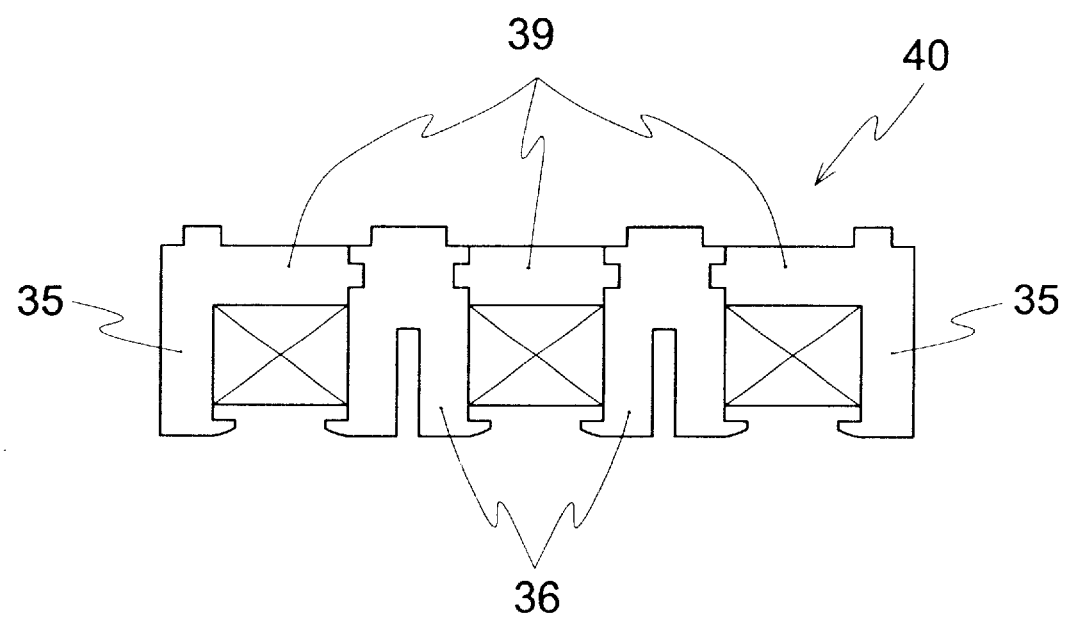
FIG. 9 is a plan view showing yet another iron core.

Further iron core according to the present invention will now be explained. In the illustrated embodiment shown in FIG. 8, magnetic pole portions of side poles 35 and a center pole 36 of an iron core 34 are formed with extension portions 35a, 36a which assume a sloped surface at sides facing winding coil portions 37. Since the presence of the extension portions 35a, 36a inhibits the winding coil 37 to be assembled, the iron core 34 is divided into three portions so that the winding coils can be disposed at spaces each formed between the center pole 36 and the outer yoke 38. It should be noted that the present invention is not limited to this arrangement of dividing the iron core into three portions, and it is also possible to employ an arrangement shown in FIG. 9 in which an iron core 40 is divided into five portions so as to assemble two center poles 36 to an outer yoke 39.

Figure 10:
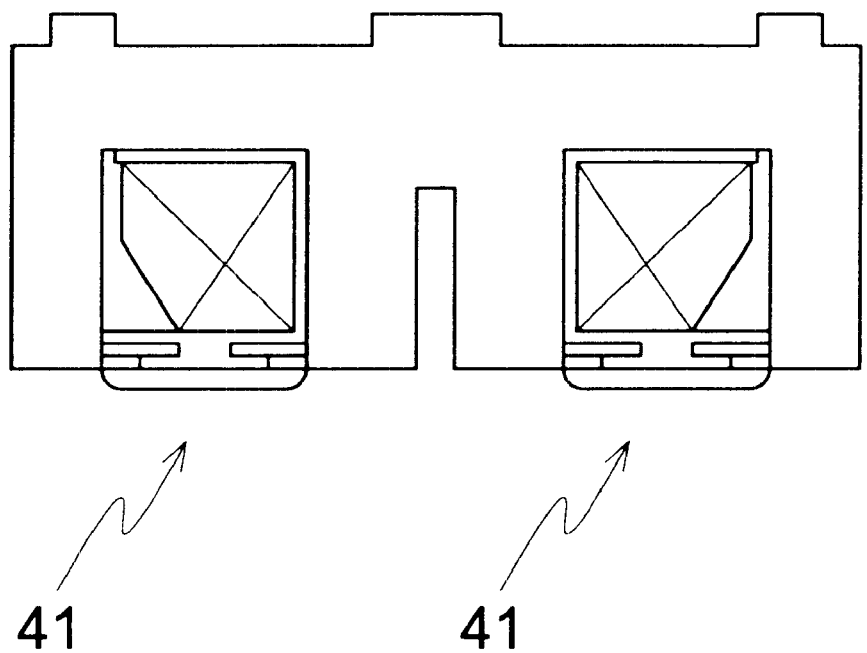
FIG. 10 is a plan view showing still another iron core.
Figure 11A:
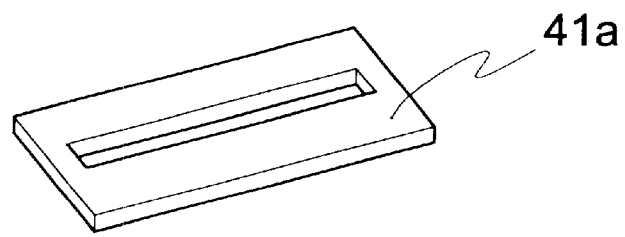
FIGS. 11(a) and 11(b) are perspective views showing extension members in FIG. 10.
Figure 11B:
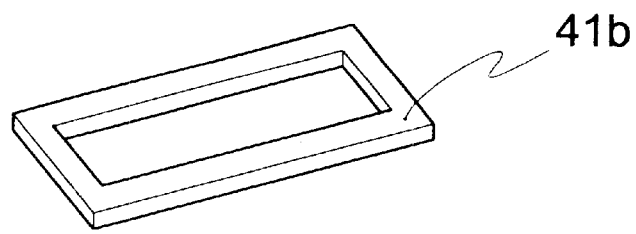

Still another iron core according to the present invention will now be explained. In the illustrated embodiment shown in FIG. 10, it is possible to replace the extension portions of the previous embodiments with separately formed extension members (magnetic wedge members) 41 which can be fitted between magnetic pole portions by means of molds integrally formed with bobbins. Such extension members 41 might be composed of two plates 41a, 41b with different sized apertures as shown in FIGS. 11(a) and 11(b). In this case, stepped portions of the plates 41a, 41b correspond to the sloped surfaces of the extension portions.

Figure 12:
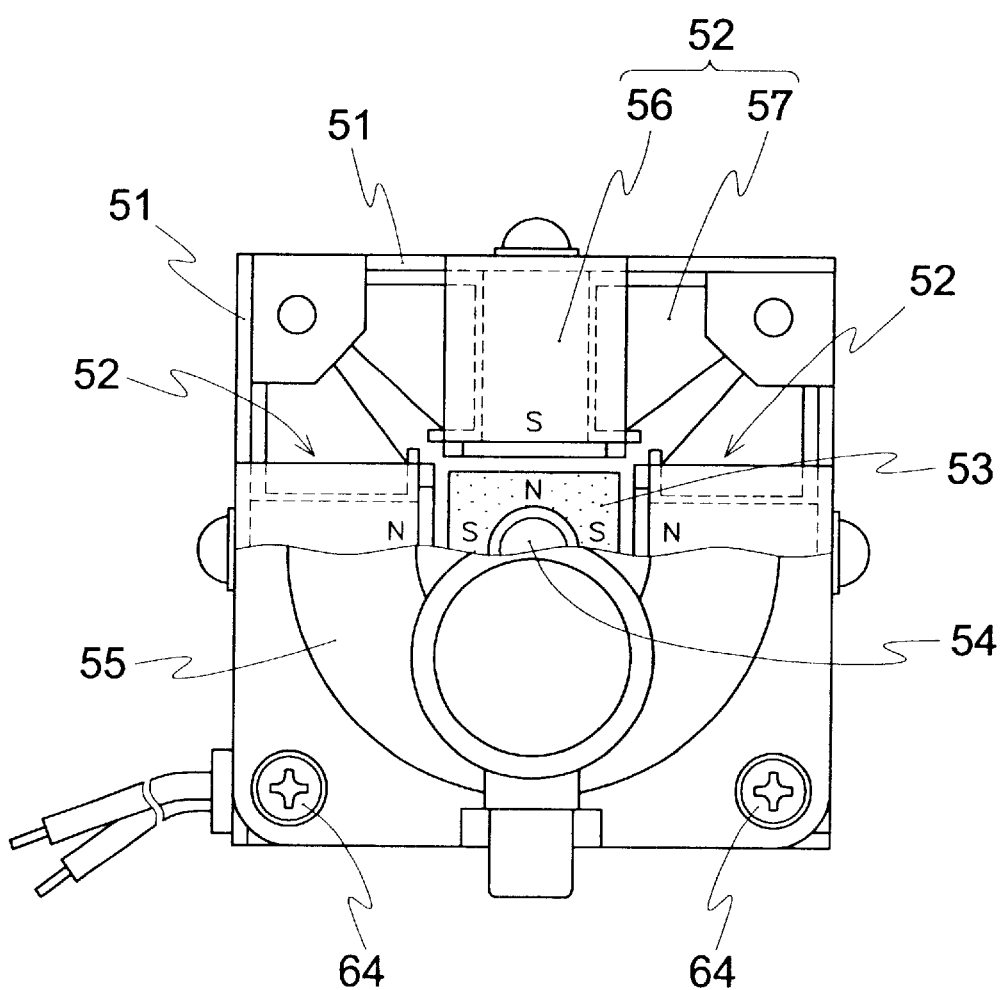
FIG. 12 is a partial cross-sectional view showing an electromagnetic oscillating type pump using an iron core according to another embodiment of the present invention.
Figure 13:
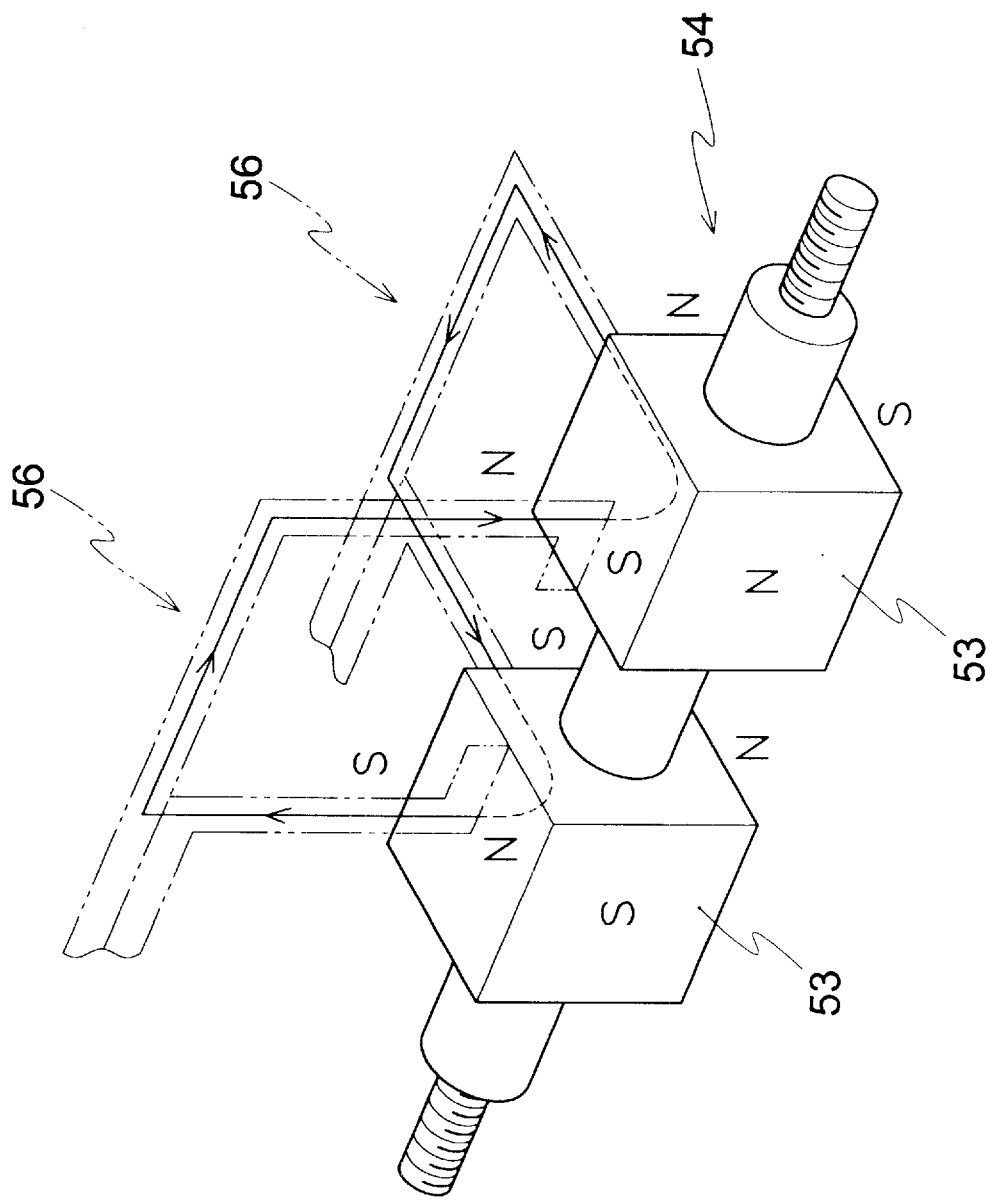
FIG. 13 is a cross view showing a main part of the oscillator in FIG. 12.

It will now be explained for an iron core used in a different type of electromagnetic oscillating type pump according to the present invention. As shown in FIGS. 12 and 13, the electromagnet oscillating type pump comprises two pairs of electromagnets 52 disposed within four frames 51 in an opposing manner; an oscillator 54 including permanent magnets 53 of ferrite magnets or rare-earth magnets which are disposed in an air gap formed between the electromagnets 52 remote from each other by a specified distance; diaphragms coupled to both ends of the oscillator 54; and a pump casing 55 fixed on both ends of the electromagnets 52. Since the oscillator 54 is enclosed by the four frames 51 in the illustrated embodiment, sounds generated by oscillation of the diaphragms can be restricted from leaking out to the exterior.

The permanent magnets 53 assume a square (prism-like type) outer shape in which they are directly attached to a shaft. The pair of permanent magnets 53 is so arranged that in one permanent magnet 53, polarities of N poles and S poles are alternately magnetized to be anisotropic magnetic poles at four positions in a peripheral direction, and in the other permanent magnet 53, polarities of N poles and S poles are alternately magnetized to be anisotropic magnetic poles at four positions in a reverse direction. With this arrangement, a three-dimensional magnetic path can be formed between neighboring iron cores 56 as shown in FIG. 13 to thereby achieve downsizing and sound insulating effects.

Figure 14:
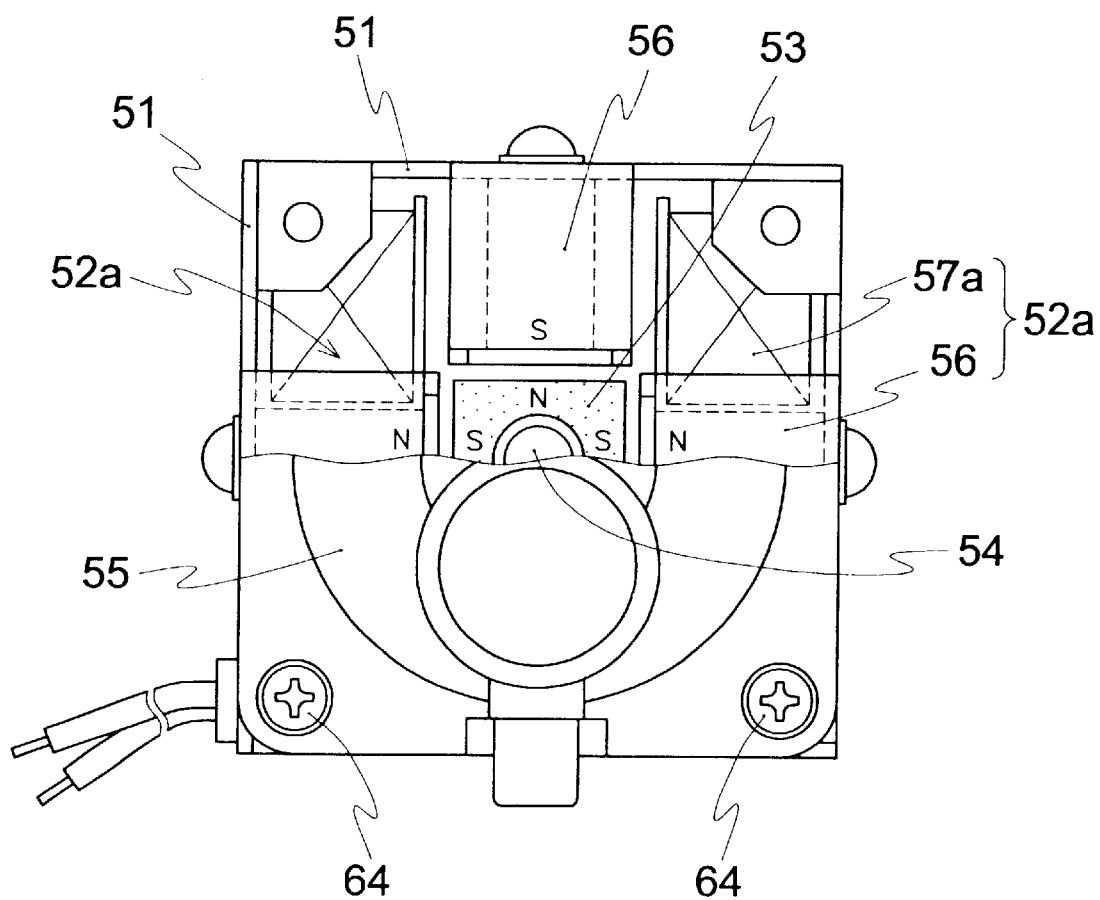
FIG. 14 is a partial cross-sectional view showing an example of an electromagnetic oscillating type pump wherein there are disposed a pair of electromagnets.

It should be noted that in the electromagnetic oscillating type pump shown in FIGS. 12 and 13, two pairs of electromagnets 52 comprising iron cores 56 and winding coils 57 are disposed as to be opposing each other in a periphery of the permanents magnets 53 of the oscillator 54 with an air gap being interposed between. However, the present invention is not limited to this arrangement, and it is also possible to employ an arrangement wherein a pair of electromagnets 52a, each comprising an iron core 56 and a winding core 57a, is disposed with respect to a S pole of the permanent magnets 53, while with respect to the N pole of the permanent magnets 53, a single core 56 without the winding coil exemplarily shown in FIG. 14. That is, the electromagnetic oscillating type pump might be arranged to include a pair of electromagnets 52a disposed in a periphery of the oscillator 54.

Figure 15:
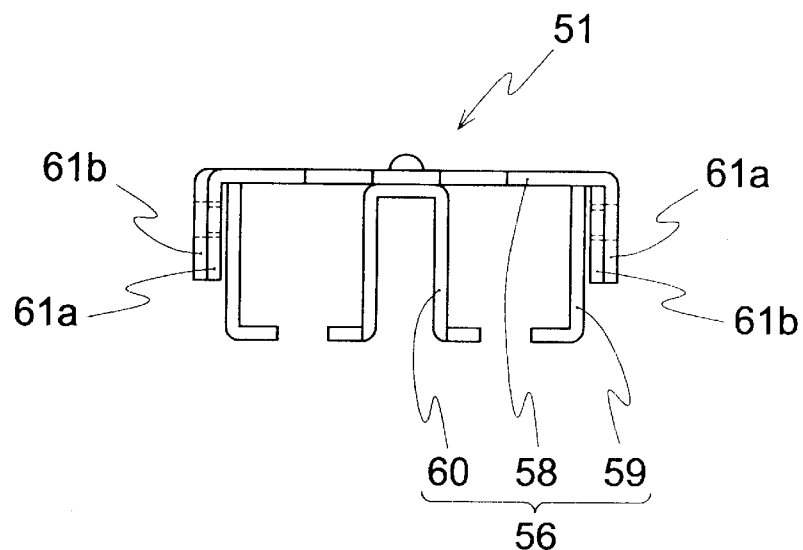
FIG. 15 is a front view of an iron core integral with the frame in FIG. 12.
Figure 16:
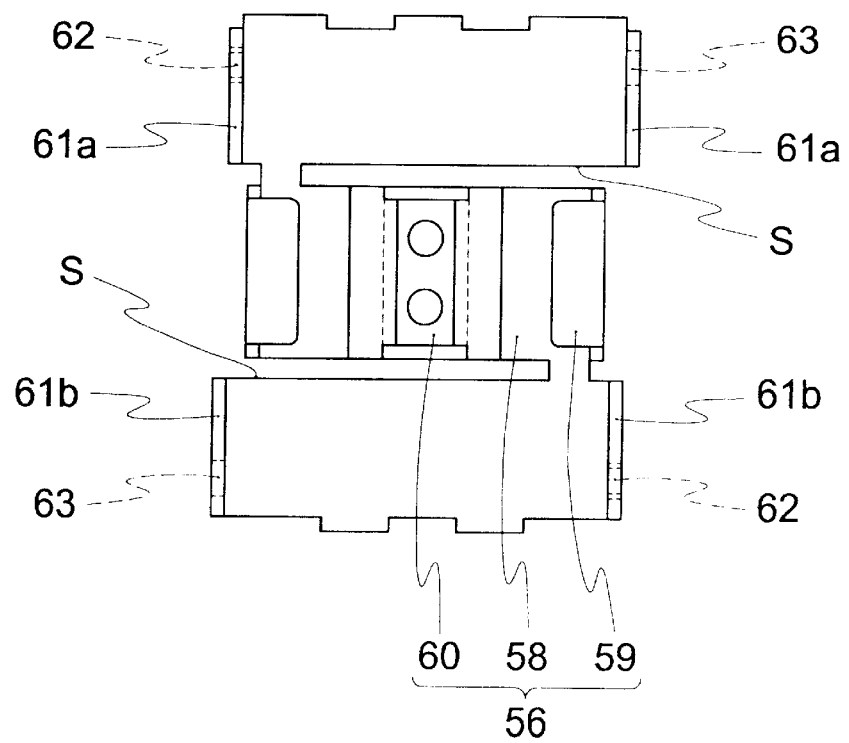
FIG. 16 is a bottom view of the iron core integral with the frame in FIG. 12.

The electromagnet 52 comprises an iron core 56 and a winding coil 57 wherein the iron core 56 is composed of an outer yoke 58 and side poles 59 which are integrally formed to a frame 51 as well as a center pole 60 which is integrally assembled to the outer yoke 58, as shown in FIG. 15 and FIG. 16. The frame 51 might be formed by blanking a single steel plate to assume a specified shape and to form four corner portions 61 and the side poles 58 through bending. In case the frame 51 is formed of magnetic material, it is preferable to form slits S on both sides of each iron core 56 so as to prevent leakage of magnetic flux as shown in FIG. 16. Sound insulating effects can be maintained even when forming the slits S since the slits S are closed by the winding coils 57. Of the four corner portions 61a, 61b, two corner portions 61a and two corner portions 61b are slightly shifted with respect to a center. Thus, for assembly of the four frames 51, the corner portions 61a and corner portions 61b are made to overlap by using the respective shifts in the corner portions. Thereafter, screw fastening is performed by making screws 64 pass through screw holes 62 and throughholes 63 formed on the corner portions 61a and corner portions 61b from the pump casing 55. With this arrangement, alignment of the electromagnets 52 with respect to the oscillator 54 can be easily performed.

Figure 17:
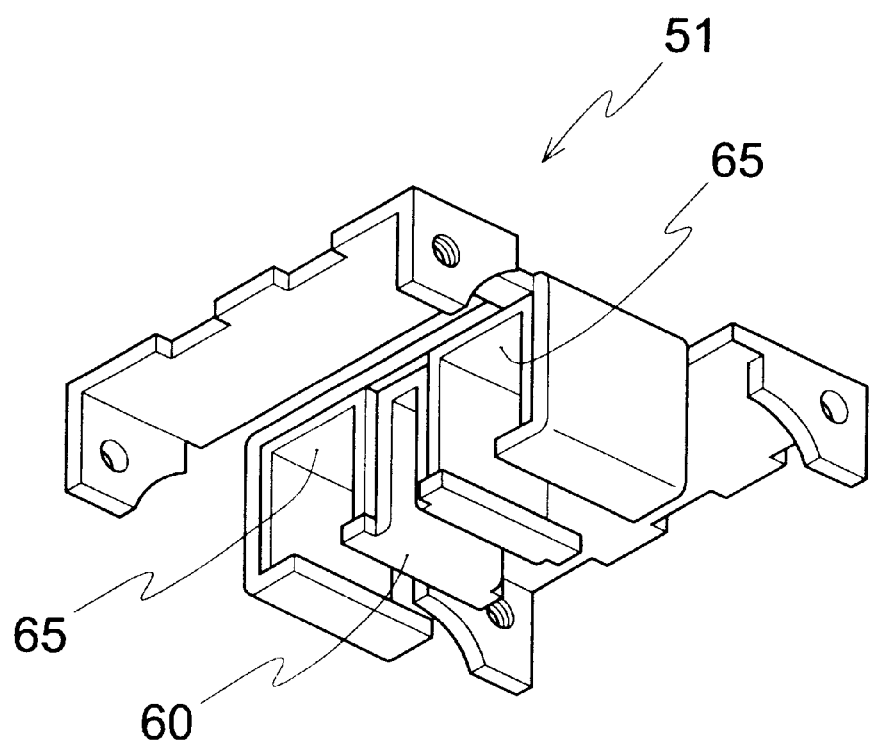
FIG. 17 is an expanded perspective view showing another iron core integral with a frame.
Figure 18:
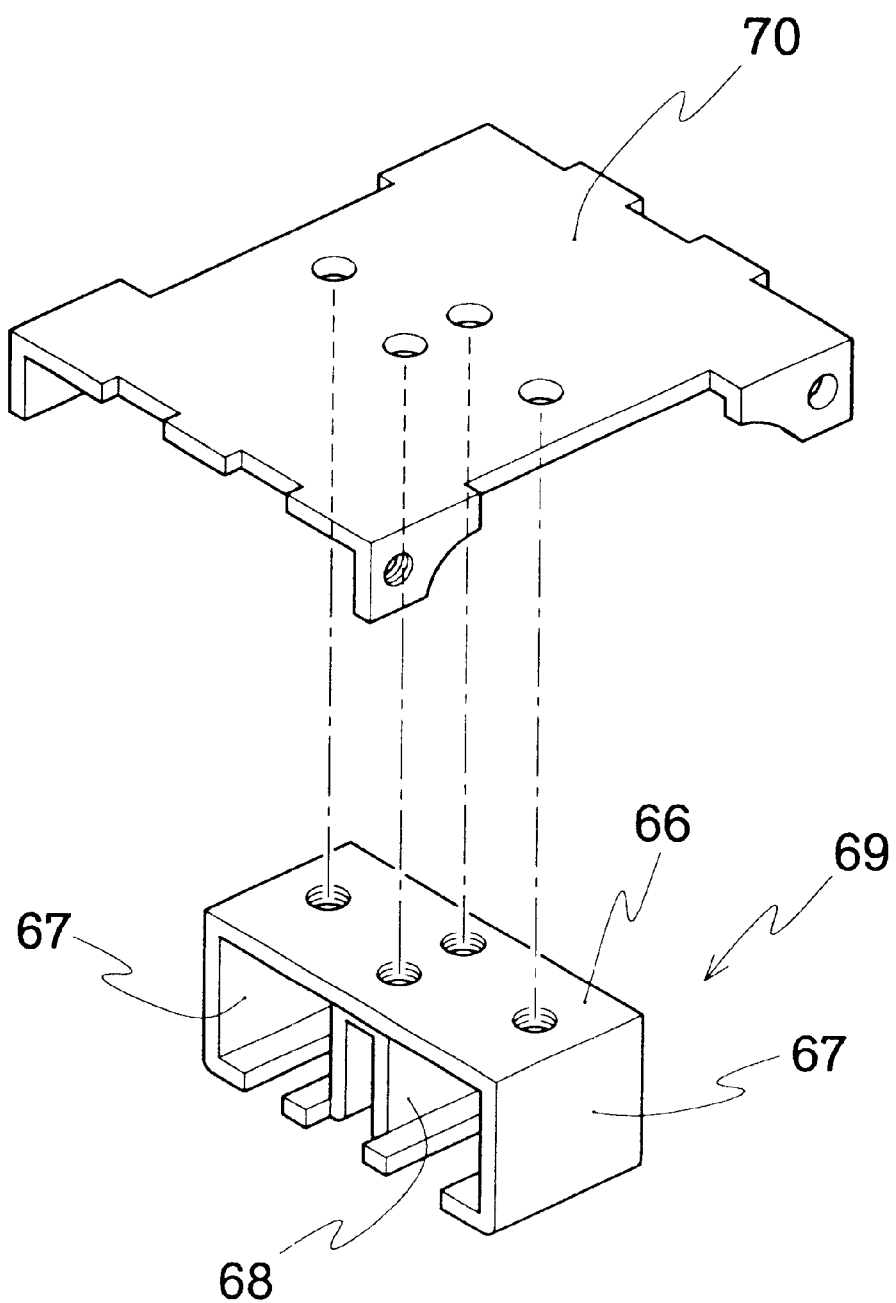
FIG. 18 is an exploded perspective view showing still another iron core integral with a frame.

Another iron core which is integral with a frame will now be explained. As shown in FIG. 17, two auxiliary yokes 65 having substantially U-shaped sections might be assembled between the center pole 60 and side pole 59 of the frame 51 to be pinched thereby so as to increase a sectional area of the magnetic path and to decrease magnetic resistance. Alternatively, it is possible to assemble, as shown in FIG. 18, an iron core 69 comprising an outer yoke 66, side poles 67 and a center pole 68 directly to a frame 70 made of non-magnetic material through screw-fastening or fusion. It should be noted that the slits 62 shown in FIG. 16 might be omitted since no leakage of magnetic flux occurs.

Figure 19:
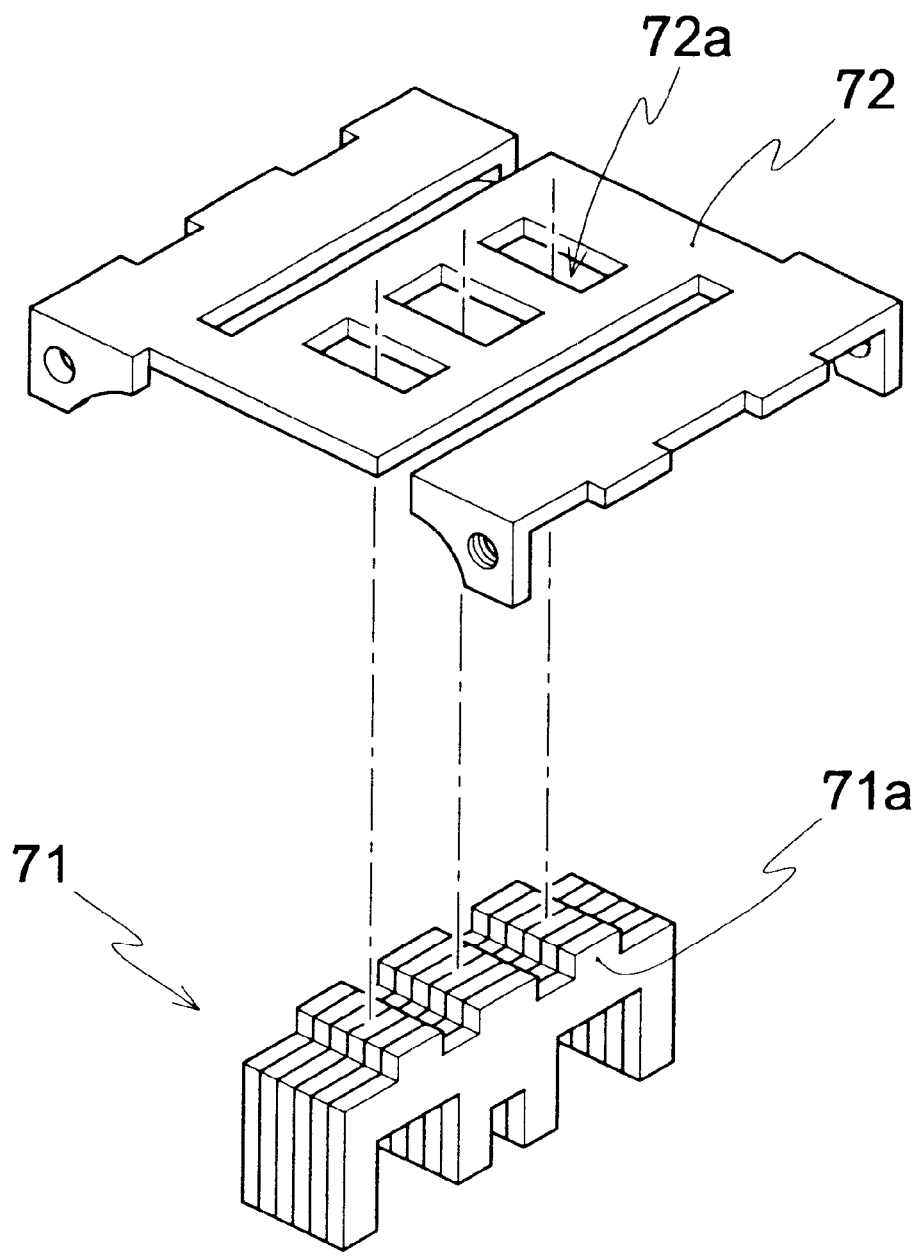
FIG. 19 is an exploded perspective view showing yet another iron core integral with a frame.
Figure 20:
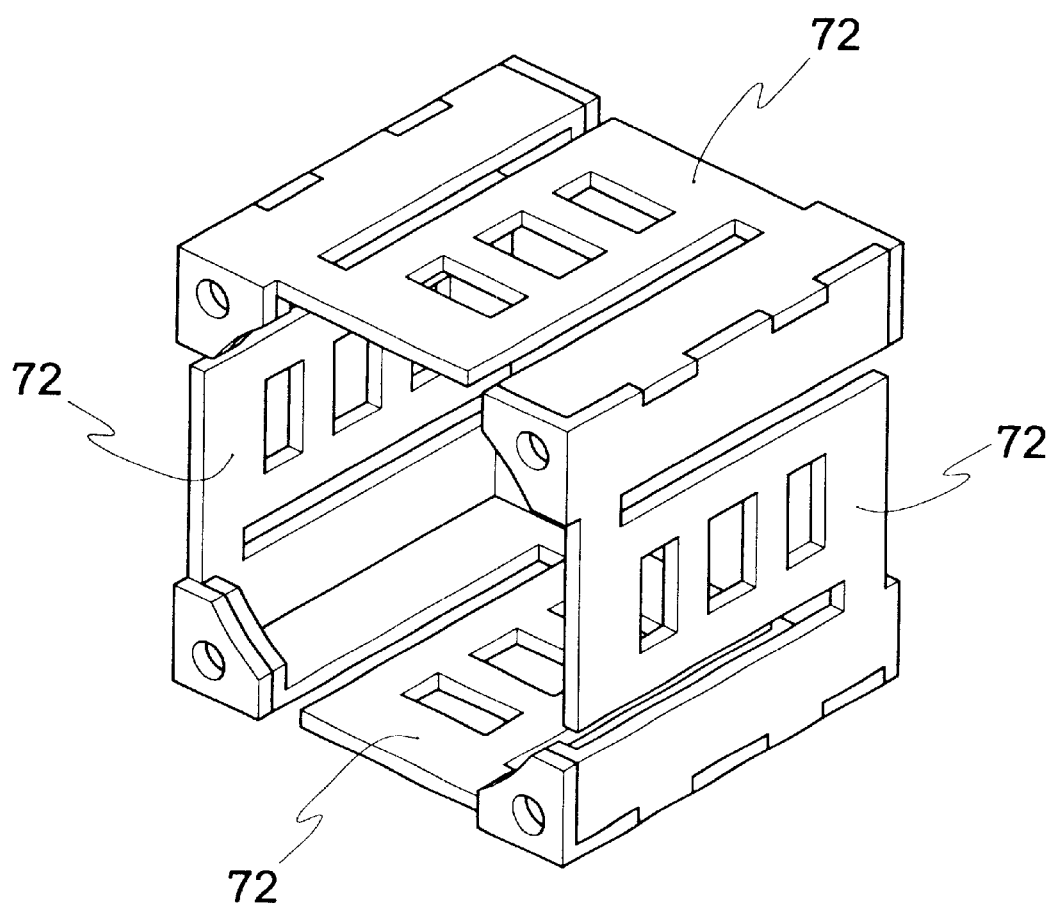
FIG. 20 is a perspective view showing a frame assembly.
Figure 21:
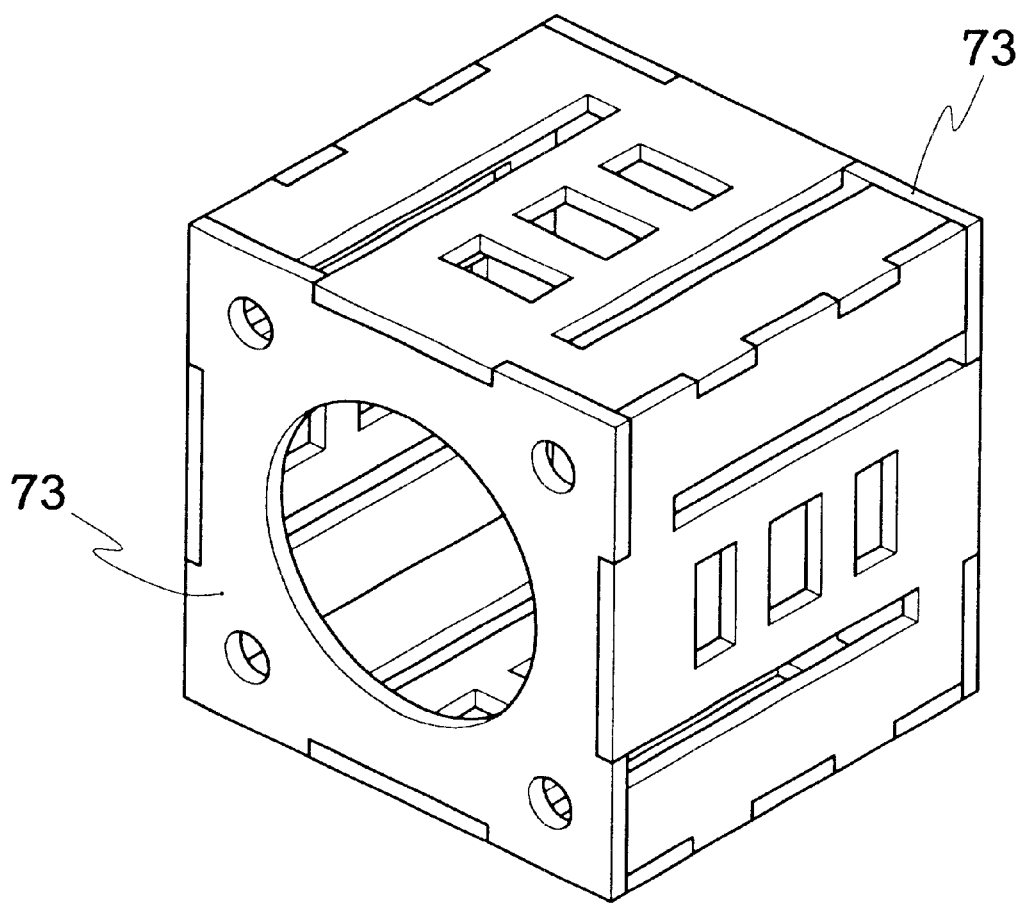
FIG. 21 is a perspective view showing another frame assembly.

Still another iron core which is integral with a frame will now be explained. In the illustrated embodiment shown in FIG. 19, an iron core 71 which is formed by laminating a plurality of stator cores of silicon steel plate is assembled to a frame 72. In this case, an outer surface of the iron core 71 is preliminarily formed with, for instance, three protrusions 71a, and the frame 72 with apertures 72a into which the protrusions 71a are fitted. By fitting the protrusions 71a to the apertures 72a, the protrusions 71a are caulked to peripheral edges of the apertures 72a. Then, as shown in FIG. 20, assembly is performed by fitting engaging concave/convex portions to each periphery of the frame 72. It should be noted that FIG. 20 is shown with the iron core being omitted. While alignment is performed by the engagement of four corner portions of the frame assembly in the illustrated embodiment, it is also possible to perform alignment by replacing the four corner portions with end plates 73 for alignment made of non-magnetic materials which are engaged with both end portions of the frame assembly as exemplary shown in FIG. 21.

Figure 22:
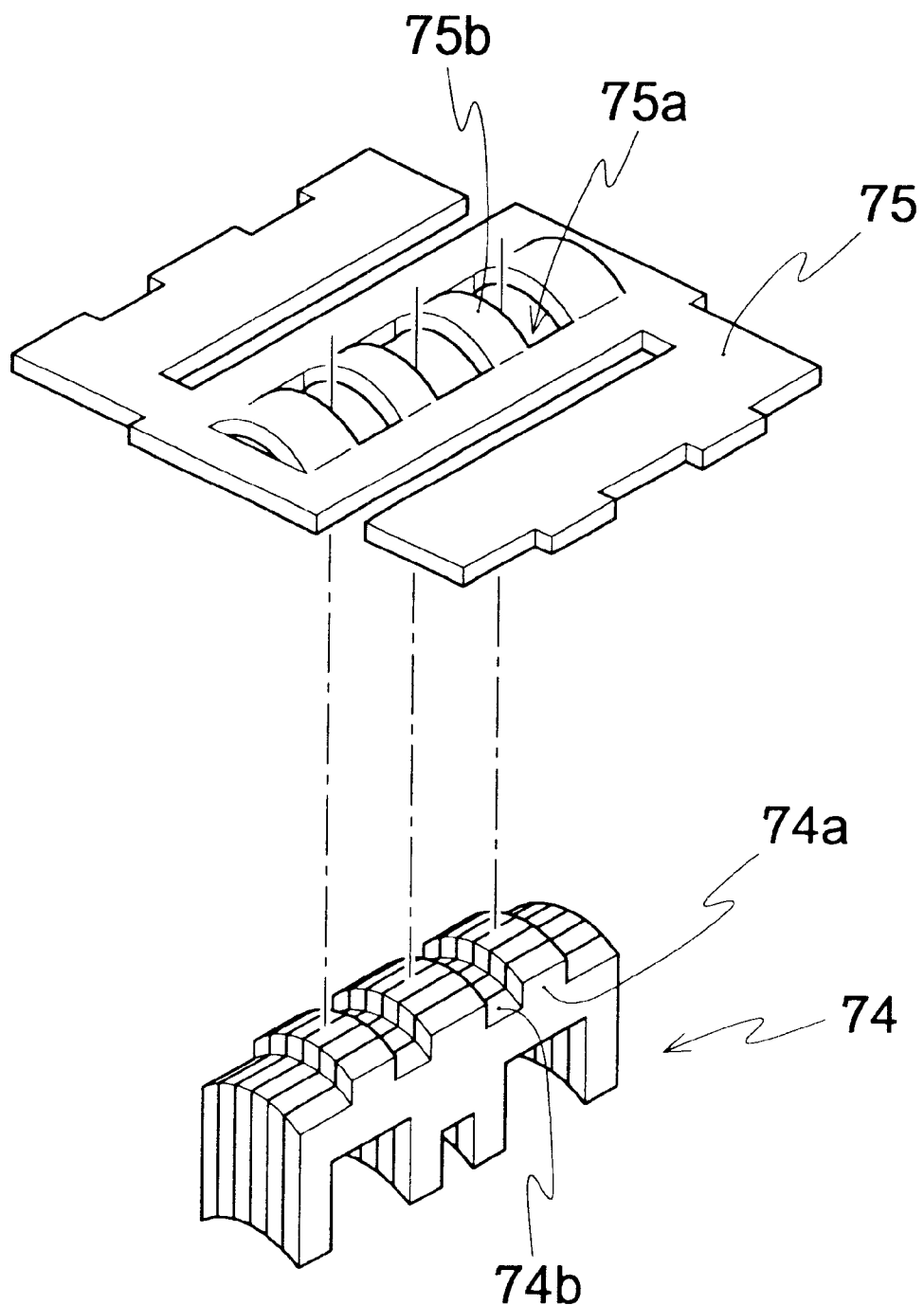
FIG. 22 is an exploded perspective view showing still another iron core integral with a frame.
Figure 23:
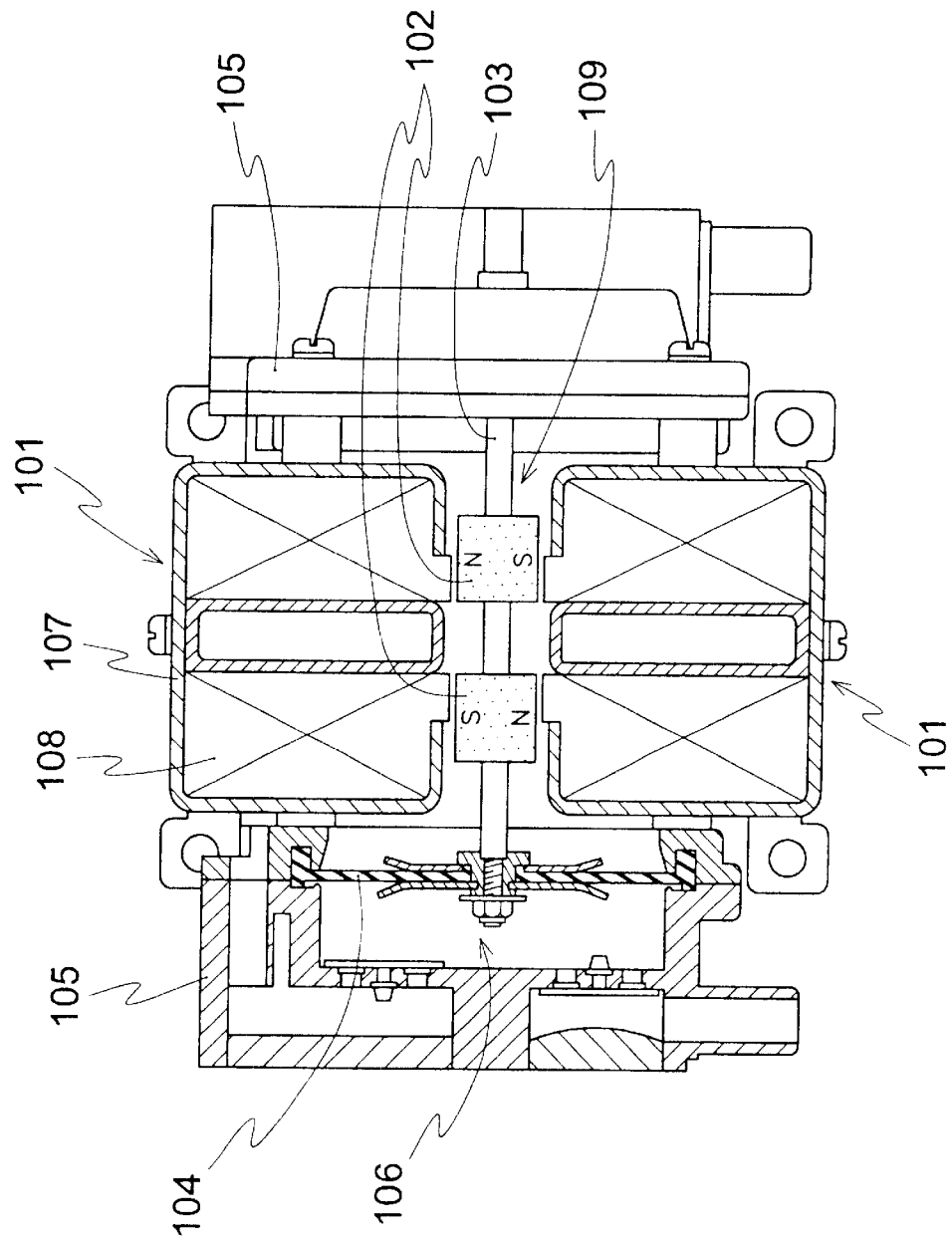
FIG. 23 is a plan view showing an example of a conventional electromagnetic oscillating type pump.
Figure 24:
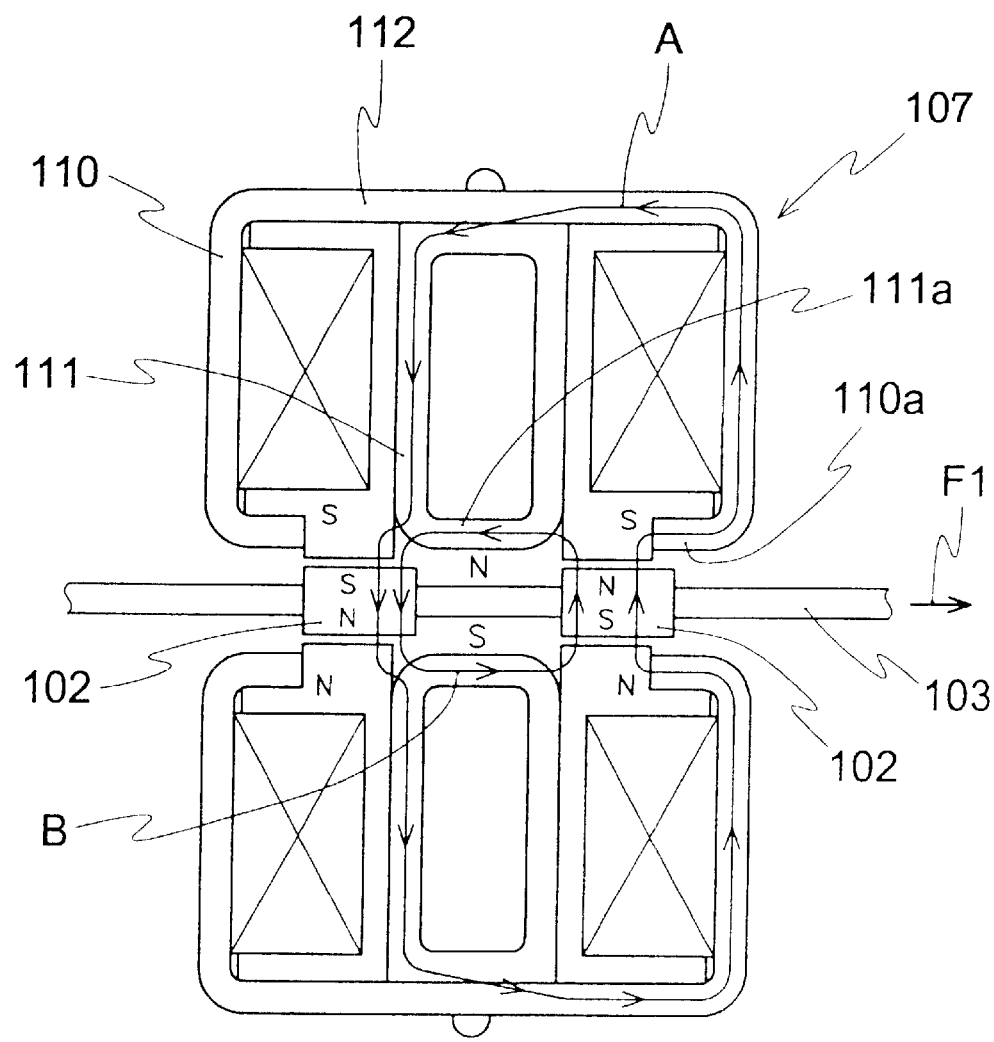
FIG. 24 is an explanatory view for explaining operations of the oscillator in FIG. 23.
Figure 25:
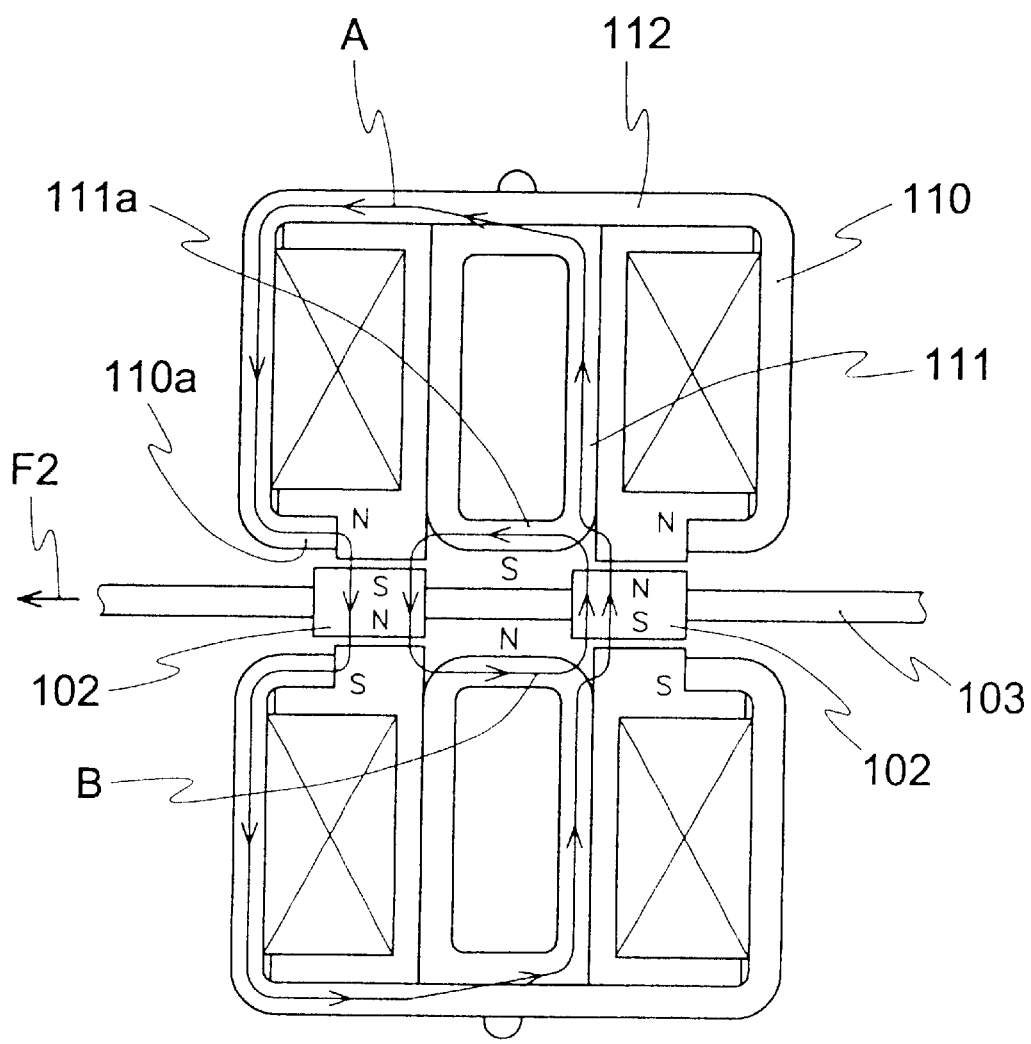
FIG. 25 is an explanatory view for explaining operations of the oscillator in FIG. 23.

Still another iron core which is integral with a frame will now be explained. In the illustrated embodiment, when utilizing permanent magnets of which outer shapes are circular rather than permanent magnets having square outer shapes, an iron core 74 having an arc-like inner shape and formed by laminating a plurality of stator cores of silicon steel plates is assembled to a frame 75 as shown in FIG. 22. In this case, an outer surface of the iron core 74 is preliminarily formed with, for instance, three arc-shaped protrusions 74a, and the frame 75 is formed with apertures 75a into which the protrusions 73a are fitted and with domes 75b which fit into concave portions 74b beside the protrusions 74a. By fitting the protrusions 74a to the apertures 75a, the protrusions 74a are caulked to peripheral edges of the apertures 75a and domes 75b accordingly.

It should be noted that while the above embodiments are based on a case in which the pump is an oscillating type pump employing diaphragms, the present invention is not limited to this arrangement, and it is also possible to employ an arrangement wherein the diaphragm-type oscillating type pump is replaced by a piston-type oscillating type pump wherein a piston is coupled to the oscillator and a cylinder is formed at the casing to enable sliding movements of the piston.

As explained so far, since the present invention is so arranged that magnetic paths of pole portions of center poles of iron cores are formed as open-circuits, there can be restricted for short-circuiting of magnetic flux of permanent magnets and thrust of an oscillator disposed at an air gap formed between electromagnets can be improved.

Further, since an outer peripheral portion of an iron core might assume a box-like body through its frame which can be completely closed, noise generated at a pump portion can be decreased.

Moreover, since an electromagnetic portion can be composed of four iron cores of an identical shape, costs involved in molds and materials can be decreased.

What is claimed is:

1. An iron core comprising an outer yoke, side poles disposed on both end portions of the outer yoke, and a center pole disposed between the side poles, wherein the center pole is formed by a pair of magnetic poles connected at one end which are separated from each other along their lengths by a specified air distance, extension portions bending away from each other are formed at another end of the pair of magnetic poles, and a magnetic path of magnetic pole portions of the center pole is formed as an open-circuit.

2. An electromagnetic driving mechanism comprising electromagnets each composed of an iron core and a winding coil which is wound around pole portions of the iron core, and an oscillator with a pair of permanent magnets disposed in an air gap within the electromagnets and separated from each other by a specified distance, in which the iron core comprises an outer yoke, side poles disposed on both end portions of the outer yoke, and a center pole disposed between the side poles, a magnetic path of polar portions of the center pole being formed as an open-circuit, wherein outer shape of the pair of permanent magnets which are directly attached to a shaft assume a square or circular shape, and a polarity of the pair of permanent magnets in a peripheral direction is magnetized to be an anisotropic magnetic pole.

* * * * *